United States Patent [19]

Woodman

[11] Patent Number: 5,054,230
[45] Date of Patent: Oct. 8, 1991

[54] REUSABLE WATER PRESSURE ACTIVATED FLEXIBLE SHELL PLASTIC FISHING CHUM SYSTEM

[76] Inventor: Stephen C. J. Woodman, 163 Pond St., Cohasset, Mass. 02025-1919

[21] Appl. No.: 587,670

[22] Filed: Sep. 25, 1990

[51] Int. Cl.$^5$ .............................................. A01K 97/02
[52] U.S. Cl. .................................. 43/44.99; 43/42.06
[58] Field of Search ............... 43/44.99, 42.06, 42.36; 206/315.11, 206, 388

[56] References Cited

U.S. PATENT DOCUMENTS

| | | | |
|---|---|---|---|
| 2,709,317 | 5/1955 | Pease | 43/42.06 |
| 2,979,853 | 4/1961 | Erickson | 43/44.99 |
| 3,221,436 | 12/1965 | Mikus | 43/42.36 |
| 3,654,725 | 7/1972 | Kingston | 43/44.99 |
| 3,769,740 | 11/1973 | Lang | 43/44.99 |
| 3,953,934 | 7/1976 | Visser | 43/42.06 |
| 3,974,591 | 8/1976 | Ray | 43/44.99 |
| 4,235,198 | 11/1980 | Goguel | 43/44.99 |
| 4,554,756 | 11/1985 | Thomas | 43/44.99 |
| 4,602,453 | 8/1986 | Polley | 43/44.99 |
| 4,638,588 | 8/1986 | Abadie | 43/44.99 |
| 4,685,242 | 8/1987 | Stanish | 43/42.06 |
| 4,744,167 | 5/1988 | Steele | 43/42.36 |
| 4,829,705 | 5/1989 | Dorsey | 43/44.99 |
| 4,839,982 | 6/1989 | Wood | 43/44.99 |
| 4,887,376 | 6/1990 | Sibley | 43/42.06 |
| 4,903,429 | 2/1990 | Tetenes | 43/44.99 |
| 4,903,430 | 2/1990 | DeWan | 43/44.99 |
| 4,924,620 | 5/1990 | Kimberly | 43/44.99 |

*Primary Examiner*—Kurt Rowan
*Assistant Examiner*—Chuck Y. Mah

[57] ABSTRACT

A minimally perforated, reusable, water pressure activated, slow release fish attractant chum dispenser, for deep sea and shallow water fishing; in combination with a 100% natural fish attracting chum, all of which, in combination, perform as an integral device to the process of fishing with a baited hook or fishing jig or fishing lure, when attached concentrically to the fishing line, or in relative position to the fishing line by use of a trailer of fishing line attached to the main retrieval fishing line, so as, to prevent accidental loss of the dispenser or bottom closure, without the accidental separation of said fishing line from the fishing rig.

1 Claim, 5 Drawing Sheets

REUSABLE WATER PRESSURE ACTIVATED FLEXIBLE SHELL PLASTIC FISHING CHUM SYSTEM

BACKGROUND FIELD OF INVENTION

This invention relates to the sportsfishing and commercial fishing inductries, specifically, to a method and process of slowly dispensing fish attractant chums at extreme or shallow depths by means of water pressure release of an attractant chum.

2. Description of Prior Art.

Heretofore, the Prior Art of Class 43. subclass 44.99 has in my search, revealed a lack of means to dispense a low viscosity, natural fish attracting chum in a slow release manner at great ocean depths. Previous methods incorporate a number of attempts to accomplish similar results, but lack the fundemental approach as detailed in my Invention Disclosure to the Commissioner Of Patents And Trademarks Document Disclosure Program, Disclosure Document Number 261322 dated Aug. 27, 1990. As the author of many detailed fishing articles in the New England area, I am reasonably confident the Prior Art does not address, a directly attached to the fishing line, large quantity, low viscosity, natural fish attractant chum, that is truely able to be assured, that at depths, up to at least three hundred feet, that the attractant will be present at those depths. A detailed analysis of the Prior Art will reveal the failure to present that assurance. Existing methods cannot perform this function to the best of my knowledge. A slow release method of dispensing the attractant is required at great ocean depths, and when combined with the natural ingredients of the system herein, makes this a new Utility of a flexible plastic shell vial, now associated with the packaging and hardware industries. This patent application, and the system, requires that the attractant chum be easily obtainable and that it able to flow with the ocean currents in a manner that allows fish to quickly follow its scent to the area of dispersion, immediately about the baited hook or fishing jig.

Prior Art does not consider that a low viscosity, semi-fluid, 100% natural attractant exists, nor does the Prior Art consider that this must be dispensed at extreme ocean depths and consequent extreme ocean pressures. This patent application is congruent with the manners and methods required to attain a reasonably high level of results in the attraction of deep or shallow water fishes, with a low cost to the consumer while gaining significant advantage over the Prior Art forms and methods.

While certain Prior Art allows for the dispersion of an attractant chum with semi-solids or masses, in perforated housings, or liquids in a disposable flexible shell plastic container, attached directly to a specially designed and constructed fishing hook, they cannot dispense a low viscosity attractant in a perforated housing, nor do they consider the required quantity of attractant when attached directly to a specially constructed hook. Likewise, the Prior Art does not consider the likely damage incurred at great depths when fishing over rocky structure. This patent application seeks to present a proper quantity of low viscosity attractant in a reuseable dispenser, thus, improving on the Prior Art relative to reuse of the dispenser and as it relates to working properly at extreme depths of at least 300 feet which was the maximum avaiable test depth. I believe this invention is able to work at greater depths with equally good results.

While it is well known that the use of a fish attracting chum works to the benefit of fishermen, certain Prior Art such as U.S. Pat. No. 3,974,591 class 43 subclass 44.99 Aug. 17, 1976 to Otis Ray, Seminole, Fla. cannot work with a low viscosity semi-fluid attractant due to the extreme of perforations in the design of the housing. This housing cannot contain a semi-fluid for any reasonable period of time, as it would simply leak out at atmospheric pressure. If a low viscosity attractant were placed in the Otis Ray dispenser, and then sent to the bottom, the water pressure, and subsequent entrainment by velocity pressures would wash the attractant entirely from the perforated housing, rendering the Otis Ray dispenser useless, when used for a low viscosity attractant chum. The Ray patent requires a semi-solid mass reference 17 of that patent. Very simply put, the water action, acting against a perforation causes vortexing and increased velocities through the perforation, and, results in the wiping away of the attractant at a rate that increases itself as less of the attractant is present in a perforated housing.

U.S. Pat. No. 4,554,756 class 43. subclass 44.99 Nov. 26, 1985 to Mit Thomas, Malakoff, Tex., is close in Prior Art, but, lacks certain abilities such as, reuse of the flexible shell housing, the quantity of attractant required to reach great ocean depths, due to the required hook size, and specifically, the facts that, it requires a specially engineered and constructed hook, a specially engineered and constructed scissor like tool, required so as, to fasten the disposable housing to the hook, a speciallized method of sealing the disposable housing, and an unknown adhesive, that must, in fact, stand up to the water pressure, and the detereoration caused by water in general, which generally would require great efforts in the finding of a non heat treated adhesive able to function below the water, while under pressure. All of the aforementioned, requires a high tooling up cost, with the production of esoteric tools and machinery for filling and sealing the dispenser, and finally, while this patent appears excellent in its scope, it can be used only once, rendering obsolesance of the dispenser from its first time use. It is doubtful that anyone could build this system of things without great effort and consumed time in order to make the Mit Thomas patent a low cost natural fish attractant product in the marketplace, and in view of its disposable aspects, as, and when, compared to the simplicity of the applicants invention.

U.S. Pat. No. 4,839,982 class 43. subclass 44.99 June 20, 1989 to Robert Wood, Ballwin, Mo. This patent suffers the same deficiencies as the previous Prior Art, in that, containment of a low viscosity semi-fluid attractant is not possible at great ocean depths, for any reasonable period of time, due to the obvious distortion the mesh bag would be subjected to, coupled with the entrainment of water velocity pressures associated with its fall to the ocean floor, nor would this mesh bag contain the attractant at atmospheric pressure for any prolonged period of time, such as, the applicants patent has proven to do. The annular space at the bottom closure cap of the applicants invention reduces dripping or flow from the dispenser to that of an absolute minimum, at atmospheric pressures.

The Robert Wood patent was issued to contain a fishing bait, in a mesh porous bag that covers a portion of the hook, while attached to the fishing line, it could be considered as a chum, but, is primarily a means to preserve a semi solid bait. It is well known that fish respond to sight as well as smell, for this reason, when the is bait concealed, the fish are prevented from using sight as a means to determine the final location of the bait prior to striking at the bait, whereas, the applicant's invention does not necessarily conceal the attractant, but allows its flow to the surrounding downstream current, thus, drawing the fish into the vicinity of the, visually seen baited hook or fishing jig, thereby allowing the use of olfactory stimulation, and sight, as a means to maximize the normal senses of a fish in a feeding posture. For instance, recent studies of sharks in a feeding frenzy, by the well known Eugenie Clark, reveal that, they (sharks) depend on sight as a means of locating their quarry up until the very moment they strike the object to be swallowed, and at that moment, only then do they roll back the protective eyelid to protect their eyes. Hence, these studies verify the fact, that sight and viewing of the quarry is a prime requirement of feeding fish. Trout, on the other hand, depend primarily on sight as a means to locate for instance, a mosquitoe on the surface of the water. Trout fishermen using trout flies, while fly rodding, do not depend on any external olfactory senses of the fish when presenting a trout fly having virtually no odor, several feet below. Trout also depend on their combined olfactory and sight senses when pursuing an earth worm. While this seems to be a lengthy of explanation of a fishes abiltity to locate their quarry, it is necessary to make the reader aware of exactly how fish respond to the presentation of baits and attractant chums.

U.S. Pat. No. 4,829,705 class 43 subclass 44.99 and class 43, subclass 54.1 May 16, 1989 to Harris Dorsey, Port Neches, Tex., relates to a chum basket of larger proportions than could be used while fishing with a fishing rod. It is a basket with a door meant to be hung from a rope or wire while suspended from an object above, for instance, a boat or a bouy, and then hung at such a depth as the user deems necessary to attract fish to his fishing rig. It is a weighted device of unknown physical proportions, and given the extreme perforations of the basket, would not allow for the dispersion of a low viscosity attractant, and in fact, lends no purpose to the applicants invention contained herein. The Dorsey patent as it stands, is unable to be used in the manner the applicants invention requires.

U.S. Pat. No. 4,235,198 class 119, subclass 51 R; 119/3; and 43/44.99 Nov. 25, 1980 to Oliver Goguel, Paris, France is listed as Prior Art in those Class/ Subclass divisions, whereby, is a device meant to attract fish and feed fish. The Goguel patent does not relate specifically to the catching of fish, and in its large proportions, could not present an effective means to be used from a fishing rod. As contained in its Abstract, it is meant for feeding fish.

U.S. Pat. No. 4,744,167 class 43 subclass 42.36; 43/42.1; 43/42.36; 43/43.2; and 43/44.99 May 17, 1988 to George Steele, East Greenbush, N.Y. In its Abstract, the Steele patent covers a fishing lure, comprised of a stabilized keel combined with a hook and an absorbant deformable material, with the deformable material used to retain the odor of an attractant chum liquid. This device, is not, a slow release, dispenserized fish attracting system, and could not contain the quantity of low viscosity semi-fluid attractant in a slow release method, as the applicants invention illustrates as being required of the invention.

U.S. Pat. No. 4,903,430 to Thomas DeWan, filed Feb. 8, 1989 and apparently issued Feb. 27, 1990 in that Gazette; St. Petersburg, Fla. class 43, subclass 44.99 This is a recent patent to a fish bait, attached directly to the body of a living fish, does not attach directly to the line, would or could be lost on the first strike of a fish given its proximimity to the bait fish, and by its nature of design, is a one time disposable item, the problem is that you have to catch or buy a live fish prior to the use of the DeWan patent, and you do that, by the use of the applicants invention, to catch a fish either for bait, or for human consumption.

U.S. Pat. No. 4,903,429 class 43 subclass 43.99 issued Feb. 27, 1990 to John Tetenes, Amityville, N.Y. This device is a chum basket meant to float on the surface of the water and attract fish to the vicinity of the basket, it does not attach directly to the line, but is meant to draw fish into the area, where hopefully, the fish will go in search of your baited hook, there is no resemblance to the applicants method, nor, presentation thereof.

U.S. Pat. No. 4,924,620 U.S. class 43, subclass 44.9 filed Apr. 14, 1989 and as apparently issued May 15, 1990 to John Kimberly, Hornsby, New South Wales, Australia, This patent is for a fishing float with a dual compartment, one of which is used for ballast, and one of which could be used for a semi-solid attractant chum. It could not be used for a semi-fluid attactant, given the high amount of perforations. This patent bears a striking resemblance to the Otis Ray, U.S. Pat. No. 3,974,591 in that, the design of same, is a float with perforations allowing the release of a semi-solid mass to the surrounding water, and in no way bears a resemblance to the applicants patent application contained herein, nor could it contain a slow release, low viscosity attractant as the applicants invention is required to do.

U.S. Pat. No. 4,930,245 class 43, subclass 42.17 as filed Sept. 26, 1989 and apparently as issued June 25, 1990 to Guido Bazzano, Alessandria, Italy. This recent patent is an artificial spoon bait for fishing with an attractant chum or not. Its purpose appears dual in its nature of design, as the container is able to present a ground bait similar to the Mit Thomas U.S. Pat. No. 4,554,756, whereby, the container dispenser is placed directly to the fishing hook in a concentric manner, but adapted with a spoon flasher for enhancing the sight requirements of a fish, as previously discussed herein, and a rotatable body, so as, to allow a varied flow of the ground bait to be emmitted from said container. This device would suffer the same results as the Mit Thomas patent over a rocky North Atlantic ocean floor, as, it is imperative to prevent the container from damage caused by the ocean floor. This device can be used without an attractant, making it, truely a fishing lure, whereas, the applicants invention is not a fishing lure by its essence.

U.S. Pat. No. 4,930,247 class 43, subclass 42.31 as filed July 3, 1989 and apparently issued June 5, 1990 to Eugene DuBois, Louisana. This patent covers a fishing lure spinner blade with rattle chamber. This is a fishing lure, and its chamber contains a rattle for attracting fish, it does not contain a chamber for the release of an attractant chum, and depends on the third sense of hearing of the fish combined with sight, but lacks the ability to utilize the sense of smell as previously discussed herein, which is a prerequisite of the applicants invention.

U.S. Pat. No. 4,887,376 class 43 subclass 42.06 Dec. 19, 1990 to Ken Sibley, this patent is for a chemically based fish attractant. U.S. Pat. No. 4,752,480 class 426, subclass 1; June 21, 1988 to Jean Paul Charbonnier, Paris, France, this patent once again is a myriad combination of chemicals to form a fish attractant.

U.S. Pat. No. 4,826,691 class 426, subclass 1, to John Prochnow Spirit Lake, Iowa. This patent was issued to cover the attracting of fish with a water soluble, one time use, fish attractant membrane gelatinous film, put to the surface of a fishing lure, where its gelatinous formulation would attract marine life. It is not at all similar to the applicants invention.

U.S. Pat. No. 3,654,725 class, 43 subclass 44.99 Apr. 11, 1972 to William Kingston, Dublin, Ireland. This patent is a fish bait dispenser system of mechanical design, whereby, a time release mechanism is sheared by galvanic action, and a knife blade is sprung from its holder, by that action, cutting open the vacuum sealed bag. It is unclear how long this takes and it is not at all similiar to the applicants invention, nor is it meant to be used from a fishing rod, but seemingly, to be used in a baited fish trap, where the fisherman leaves the trap for a few days.

U.S. Pat. No. 3,654,724 class 43 subclass 42.06 Apr. 11, 1972 to John Charron, Manitoba, Canada. The Charron patent is a fishing lure with an ability to be used with blood, liver, worms etc together with a weight if desired. It is not similar to the applicants invention in that the applicants invention is not a fishing lure, contains no hook(s) and is totally independent as it relates to its methods used to attract fish.

U.S. Pat. No. 3,769,740 class 43, subclass 44.99, Nov. 6, 1973 to Albert Lang, Bloomfield, N.J. The Lang patent bears a striking resemblance in the U.S. Pat. No. 4,924,620 to John Kimberly New South Wales Australia, discussed previously, in that, it is a bouyant chamber with a chum releasing method and it does not form an integral part of the fishing line in a concentric manner, and reveals the possibility that it would or could be seperated while in use, rendering loss of the top chamber. As per the Kimberly patent, the Lang patent is not similar to the applicants invention.

U.S. Pat. No. 3,953,934 class 43, subclass 42.06 May 4, 1976 to Melvin Visser, Portage, Mich. this patent is close in prior art, in that, it is concentrically placed about the fishing line and is able to present a fish attractant chum, but, it is constructed of, a rigid, sintered metal body formed from metal powder, which is required to be impregnated by soaking the device for a period of time in a fish attractant chum, whereby, the release of the attractant chum is from the pores of said metal device, it is unclear how the device would act under extreme pressures, and exactly the quantity required so as to assure reaching those depths, it is not a container, but a porous device made of metal, having no resemblance to the applicant's.

U.S. Pat. No. 4,138,794 class 43 subclass 43.14 Feb. 13, 1979 to Fernando Chiodini, Brooklyn, N.Y. This patent covers a combination sinker and bait jiuce dispenser with a sponge, and plunger, to release a fish attractant chum. The applicants invention is not a sinker, has no sponge, releases the attractant chum by means of water pressure, and is concentric about the fishing line, it has no similarties to the applicants invention.

U.S. Pat. No. 4,602,453 class 43 subclass 44.99 July 29, 1986 to Rulu Perez, and Julio Perez, Miami, Fla. This invention is a Bait activator device with a direct current motor, having no similarity to the applicants invention as the applicants invention, has no motor, and uses the forces of nature, to perform its intended function.

U.S. Pat. No. 4,602,453 class 43, subclass 44.99 July 29, 1986 to Joesph Polley, Massapequa, N.Y. This patent covers a Scent Lure and an arrangement for attracting fish from said lure when it is combined with the "float for storing scented fluid", "a tube spacing said lure from said float and providing flow communication from said float to said lure". This patent does not concentrically become an integral working portion of the main fishing retreival line, but conveys scent directly to the fishing lure and does not resemble the applicants invention, and would be damaged or caught by or between rocks.

U.S. Pat. No. 4,638,588 class 43, subclass 44.99 Jan. 27, 1987 to Carole Abadie, Irving, Tex. This patent issued to cover a fish attracting device having no resemblance to the applicants invention. It is a chum basket of sorts.

U.S. Pat. No. 4,638,584 class 43, subclass 17.6 Jan. 27, 1987 to William Lindsay, West Monroe, La. This patent is close in Prior Art, but requires the use of a fishing lure so as to make the embodiment complete in its form. It does discuss a flexible outer capsule, but, is issued to contain a "Luminescent" chemical composition, that, whereby the fracturing of an internal and frangible membrane causes the mixing of two chemicals, it is, in fact, a non-reuseable chemically based compound, that releases chemicals to the Eco-System, requires its use with an opaque fishing lure, and in no manner or form resembles the applicants invention, which requires, reuse of the dispenser vial for reduced stress to the environment, by its required reuse, and non-chemical nature of the attractant chum.

Objects and Advantages (1 to 30)

Accordingly, to the above and consistant with my own invention, the following objects and advantages are as follows 1. The system of my patent application is easily dispersed at a slow rate from a vial having physical properties that by its placement concentrically on the fishing line, above the jig, or the bait, protects said dispenser from damage making it a design utility having extended use above the Prior Art.

2. It is a 100% natural fish attractant chum product.

3. It offers a higher assurance that fish will in fact find the offering of the bait or jig at extreme ocean depths.

4. It is a self contained system of premanufactured parts, that, when combined with the attractant, presents a unitary system of reliable fish attracting ability.

5. It has virtually no chemicals

6. It does not pollute the Eco-System

7. It cannot harm, endanger, or otherwise injure the organisms in the marine or inland lakes Eco-System 8. The attractant contains no flourocarbons such as spray attractants do, in its use or mixing of its ingredients.

9. The attractant is safe to the environment, and could, in fact, be used for human consumption in a worst case scenario of men lost at sea.

10. The attractant is reasonable in cost to produce

11. The attractant can be produced with a fundemental knowledge of ingredient mixing 12. The dispenser could easily be made from household goods or those available in short notice 13. The system, does, in fact, outfish other so called fish attracting chums when compared to actual offshore fishing tests, as my Invention Disclosure previously submitted.

14. The inverted position of the dispenser closure protects the dispenser from damage over its customary use as a standard vial with the cap placed on top of the vial 15. The flexible shell plastic vial dispenser is able to be reused for numerous fishing trips, until the vial is snagged on the bottom of the ocean floor by virtue of an accidental snagging of a fishing hook on the bottom 16. The system of filling the dispenser does not require the use of specially engineered or constructed tools 18. The system of sealing the dispenser vial does not require the use of specially formulated adhesives 19. The entire system is of a low technological art making its use rational for the average individual fisherman to use, construct or otherwise convey the intent of same in use 20. The system does not require specially engineered hooks.

21. The system is easily fished from the fishing line and in the direct relative area of the fishing jig or a baited hook 22. The system is unable to be lost without separating the two major components from the fishing line as stated above, thus, allowing less foreign materials to enter into the fishing grounds, whether they be in deep ocean waters or shallow ponds and oceanic bay areas. This is important.

23. The system allows for multiple line sizes to be run through the dispenser vial by virtue of the drilled holes in the top and bottom of the dispenser 24. The system allows for multiple sized quantities of the attractant chum to be used in deeper or shallow waters, by virtue of the planned multiple sizes of the dispenser vial to be introduced to the marketplace.

25. The viscosity of the chum is able to be varied in its semifluid condition to match the depth and release rate as adjudged by the user by by virtue of the drilled hole sizes and line gauge which may be altered by the user at any time during its use to release more or less attractant, either by draining a portion of the fluid, or increasing the line gauge to decrease flow, or decreasing the line gauge to increase flow, based on a predrilled hole size without changing dispensers.

26. A sleeve of higher density plastic may be installed directly over the dispenser to retard the distortion of the flexible shell plastic, thus reducing the emmited flow beyond that stated in 24. and 25. above.

27. There is no need to artificially color the dispenser vial

28. There is no need to perforate the shell with any ulterior means or tool once the shell is manufactured.

29. The system reduces, over other Prior Art, the possibility that fishermen would discard the reuseable dispenser vial into the ocean or inland waters given its reuseable design, thus, reducing the possibility of discarded plastics into the eco-system.

30. The system is ready for the marketplace and requires nothing more than its production and introduction to the marketplace and willgain immediate acceptance by the end user, being fishermen.

REFERENCE NUMERALS IN DRAWINGS

The following reference numerals are congruent with the parts thereof, and not repetitive in that they could not indicate any other part than the numeral indication of said part 5: The Dispenser Vial
10: The bottom closure cap
20: Exterior of the Dispenser Vial
30: The interior of the dispenser vial
35: The actual fishing line or leader used on the fishing rod
40: The top entry concentric hole
45: The top sealing surface of the dispensing vial
50; The bottom exit point of the closure concentric hole
55; The annular space about the top entry point of the fishing line or leader
60; The section marker taken at the top of the dispenser vial
65; The core extension of the closure cap per 10 above
70; The section marker taken ½" above the bottom of the 5 dispenser vial
75; The bottom closure cap annular space about the 35 fishing line or leader
80; The section marker of FIG. 1 taken about its concentrically equal center line

DESCRIPTION OF THE INVENTION AND DRAWINGS

Figure 1:
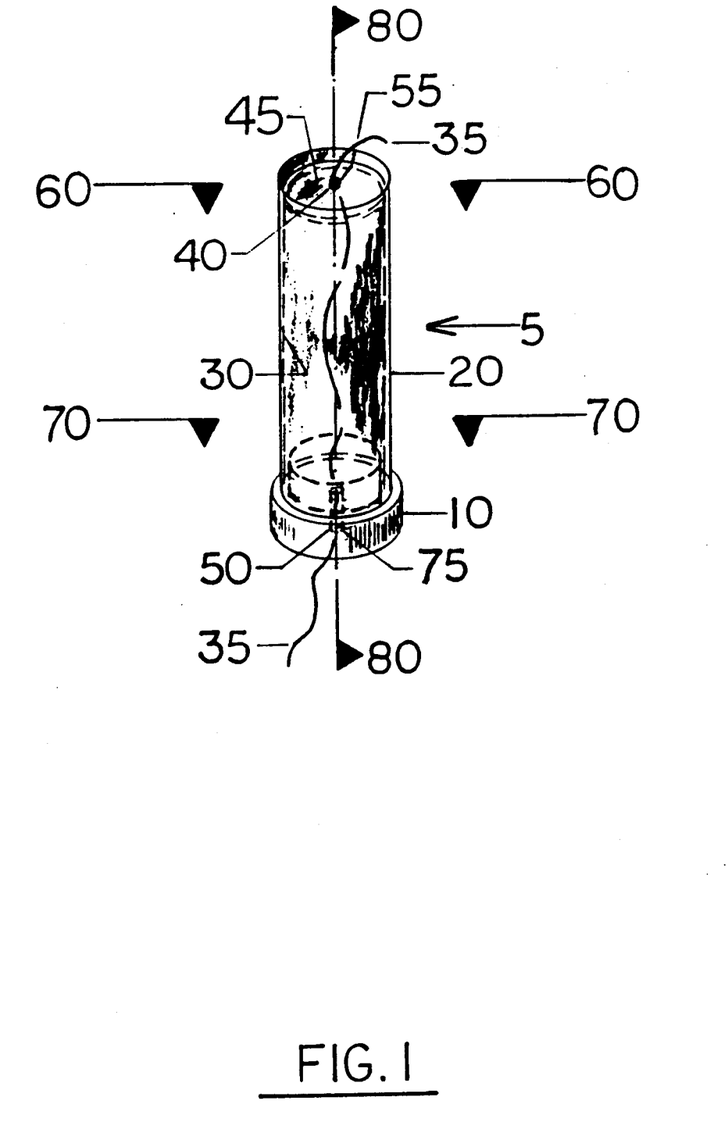
FIG. 1 is a perspective of the invention in its position of use.

FIG. 1 is a perspective of (5) the invention, in its position of use, while attached to the (35) fishing line, illustrating its (45) top surface, (40) its top drilled hole, (20) its vertical flexible plastic exterior shell, (30) its interior of the flexible plastic shell, (10) its bottom closure cap with (50) its bottom drilled hole, and (35) the fishing line or leader exiting through (50) the bottom drilled hole, and (55) the top annular space, and (75) its bottom annular space, about the position of the fishing line.

Figure 2:
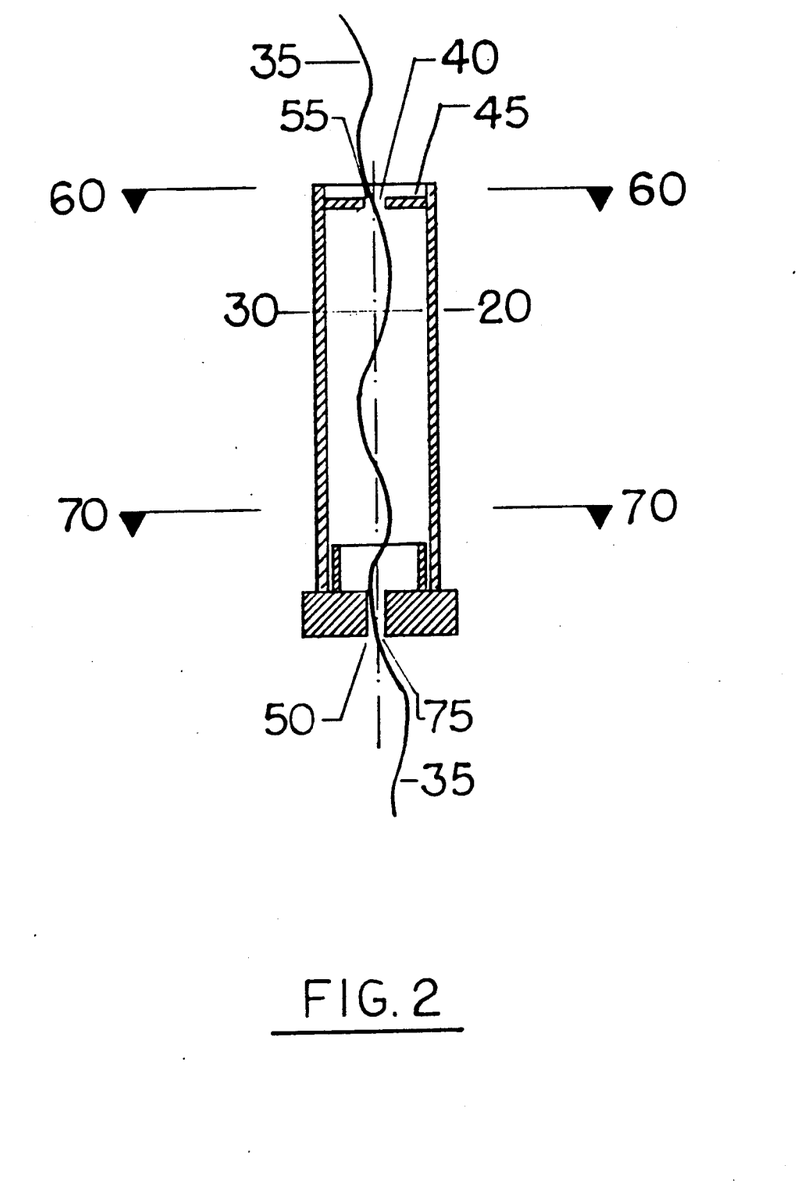
FIG. 2 is a longitudinal cross section of FIG. 1 taken about it center line.

FIG. 2 is a cross section of FIG. 1. taken about its vertical center line as illustrated by section marker 80—80 shown in FIG. 1. indicating the top surface (45) the top drilled hole (40) the exterior (20) of the flexible shell plastic dispenser and (30) the interior of the flexible plastic shell dispenser, and (35) the fishing line in position through (40) the top drilled hole running through (5) the flexible plastic shell dispenser and exiting through (50) the bottom drilled hole, of (10) the closure cap and (55) the top annular space, and (75) the bottom annular space, about (35) the fishing line or leader.

Figure 3:
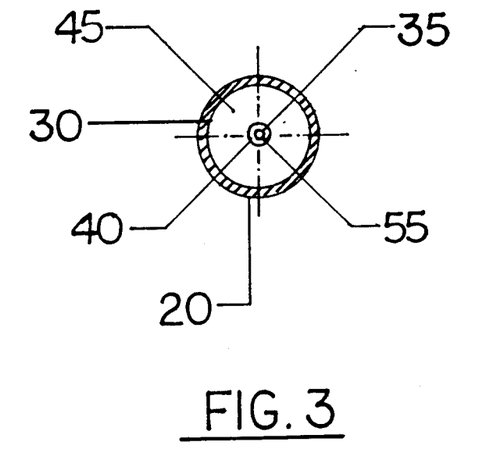
FIG. 3 is a section of FIG. 1 taken just below the top of FIG. 1

FIG. 3 is a cross section taken directly at section markers 60—60, at the top of (5) the dispenser vial indicating (40) the top concentric drilled hole, (45) the top surface of (5) the dispenser vial, and (20) the exterior, and (30) the interior of the (5) dispenser vial, with (35) the fishing line or leader running through (40) the top dispenser vial drilled hole, showing the (55) annular space about the (35) fishing line placed through (40) the top concentrically drilled hole.

Figure 4:
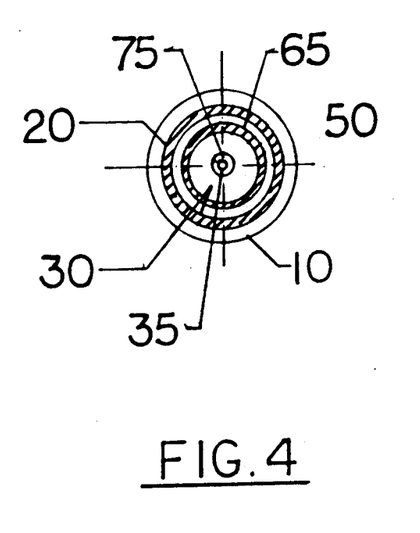
FIG. 4 is cross section of FIG. 1 taken ½" above the top of the bottom closure plug

FIG. 4 is cross section of the lower area of the dispenser taken at section lines 70—70 indicating the perimeters of the (30) interior of the flexible plastic shell dispenser, and (20) the exterior of the flexible plastic shell dispenser and (50) the bottom drilled hole, and (10) the perimeter of the bottom cap plug and (65) the core of the (10) bottom cap inserted within the (5) dispenser vial, and (75) the annular space about (35) the fishing line or leader exiting through (50) the bottom drilled hole.

Figure 5:
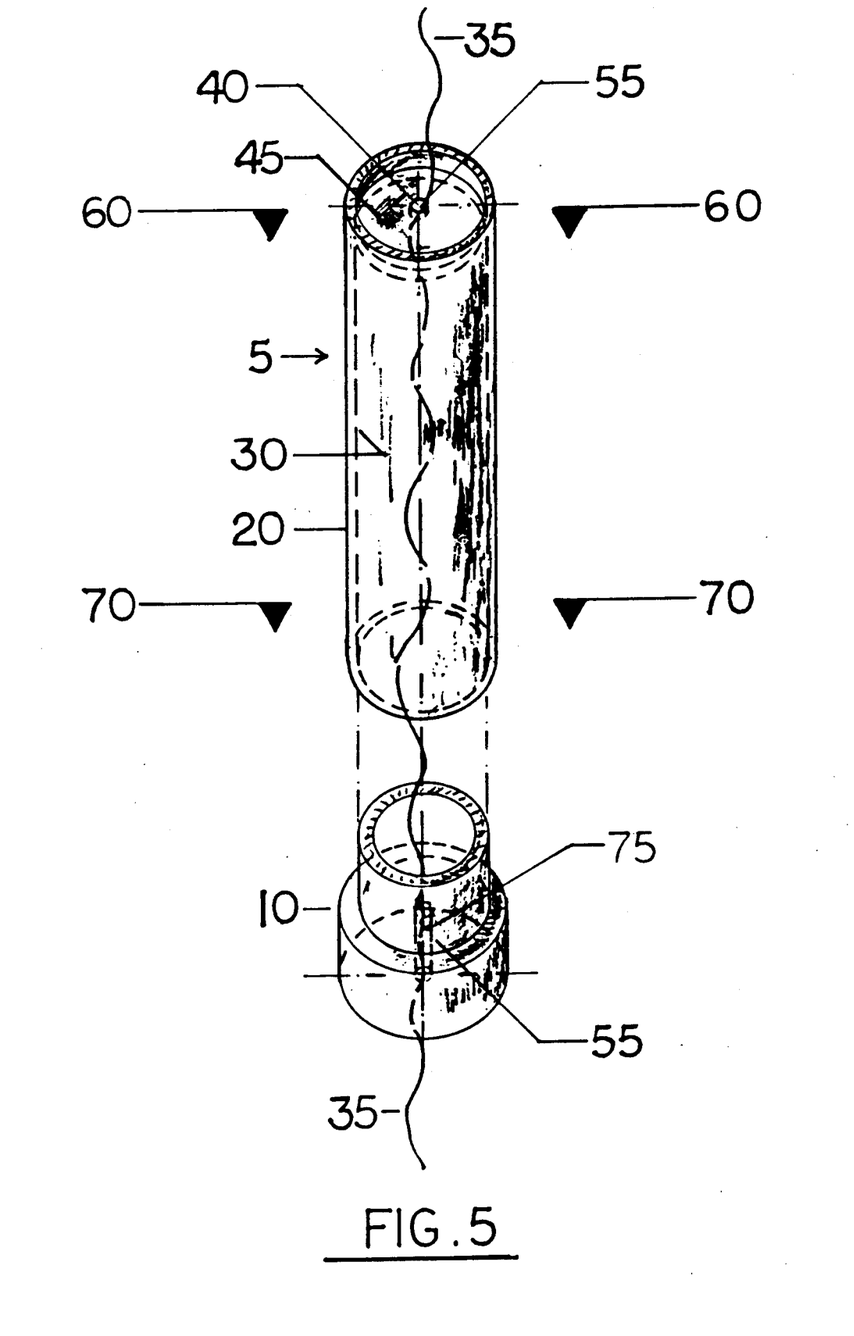
FIG. 5 is an exploded view of FIG. 1 illustrating its two independent parts.

FIG. 5 is an exploded view of (5) the vial dispenser and (10) the bottom closure cap, and (65) its core in the non-inserted position, and (40) the top concentrically drilled hole at (45) the top surface of (5) the vial dispenser with (35) the fishing line or leader inserted through (40) the top concentrically drilled hole, and (35) the fishing line, or leader inserted through (50) the bottom drilled hole of (10) the bottom cap closure, and indicating the (5) dispenser vial (20) interior and (30) exterior surfaces of (5) the vial dispenser, and (55) the top and (75) the bottom annular spaces about (35) the fishing line or leader.

Figure 6:
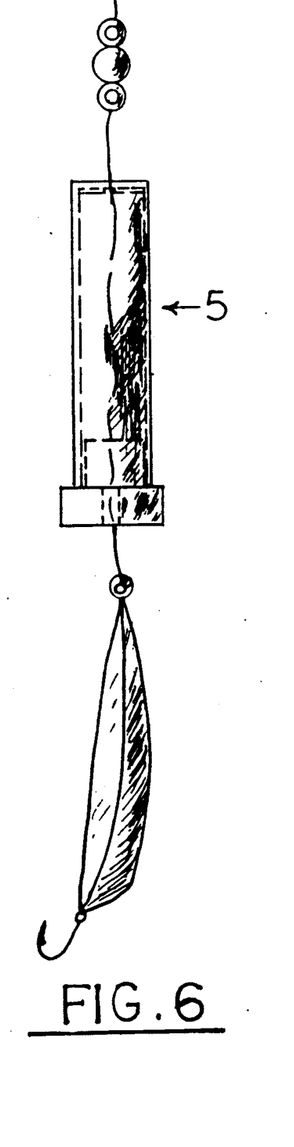
FIG. 6 is a repetitive view of FIG. 1 with an attached non-baited series of fishing hooks.
Figure 7:
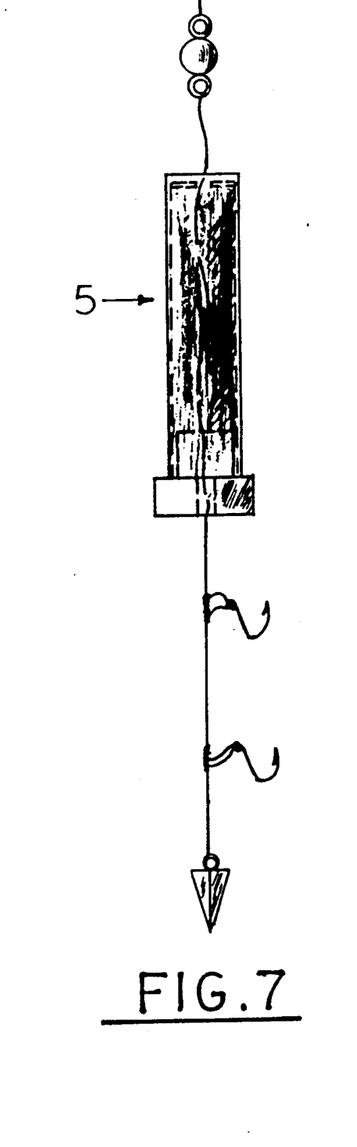
FIG. 7 is a repetition of FIG. 1 with an unbaited fishing jig.

FIg. 6 indicates the embodiment of (5) the dispenser vial in its empty pre-use condition FIG. 7 indicates the embodiment of (5) the dispenser vial while full in its use position

OPERATION OF INVENTION FIG. 1

The operation of this invention is simple, the dispenser vial is attached directly to the fishing line without the means of a locking device other than the fishing line or leader itself, whereas, the dispenser vial becomes a concentric and integral part thereof, of the fishing line or leader, by the insertion of the fishing line (35) through the top drilled hole (40) and then the traverse of the (35) fishing line through (5) the dispenser vial and then through the bottom closure cap (10) at its drilled hole (50). The next step is to fill the dispenser vial, which also, is simple and non-clumsy to do.

When the above has been instituted and complete the (5) dispenser may then be inverted, 180 degrees for the actual filling of said dispenser with the attractant chum. Upon completion of this task, the (10) closure cap is then inserted into (5) the dispenser vial and once again inverted to the use position of (5) dispenser vial, making it ready for its in use fishing or casting position into and below the surface of the water.

As the (5) dispenser vial is lowered below the surface of the water, the (5) dispenser vial is subjected to pressure, primarily about its vertical sides of the (20) exterior and (30) interior sides, whereby, said sides must be allowed to become flexible, given the below atmospheric pressures encountered, which, have an exterior presssure of force that decrease interior pressures of an encapsulated device to be equal to those pressures surrounding said device. It is this pressure characteristic that makes the reduced orifice sizes of the applicants invention, imperative in the dispersion of a semi-fluid attractant chum, thereby, allowing the attractant chum to be gently squeezed from the (5) dispenser vial at and through the annular spaces of (55) and (75) top and bottom. As this occurs the attractant chum is displaced with water in the (5) dispenser vial. In practice those are the precise results found after several months of testing. Test results are available if or when required. These were listed in the Invention Disclosure, forwarded to the PTO.

CONCLUSION, RAMIFICATIONS AND SCOPE OF INVENTION

Referencing the detailed drawings FIGS. 1, 2, 3, 4, 5, 6 and 7, the description of drawings, and the reference numerals 5, 10, 20, 30, 35, 40, 45, 50, 55, 65 and 75, plus the sections markers 60, 70, and 80 the invention is a water pressure activated, flexible plastic shell dispenser vial for attracting fish(es) in deep sea or shallow water fishing areas, combined with a low viscosity 100% natural fish attracting chum, consisting of the following functions in its hollow cylindrical, square, triangular, rectilinear or elliptical, trapazodial, ball, round, or near containment type dispenser shape having a vertical dimension equal to or greater than that of the diameter of said near containment dispenser and, having a minimum amount of perforations, orifices, and no required punctures in use, and a minimum of annular spaces surrounding a fishing line which shall pass through said dispenser, attached integrally to said dispenser, or adjacent by means of an attachment to said dispenser, or dispenser container or vial, which by the nature of said orifice holes would allow the slow release of a fish attractant to flow from the dispenser vial, to the water about said dispenser, thus, allowing the slow release of an attractant to attract fish(es) to the vicinity of a baited hook, fishing jig, or fishing lure or jig with bait present, which would allow for the release of any said attractant to be emmitted to the water from the device in consideration of a slow release attractant chum dispenser, thereof.

The dispenser, attractant chum holder (5) could be constructed of a reuseable flexible plastic shell dispenser vial having physical properties allowing the distortion of the dispenser vial at great ocean depths so as to release a fish attractant chum at a slowly reduced rate of emmittance from the dispenser vial in recognized proportions suitable to attracting fish(es) at extreme water depths, in the quantities required of extreme depths, so as to assure that one half the volume of said attractant is assuredly present on the bottom of the ocean as witnessed by the retrieval of said dispenser vial in a time frame of no less than five minutes from its placement in the water, both fresh and salt water.

And in consideration, thereof, a device having a sonically plastic welded top, or screw or plug type top (45) to the (5) dispenser vial, and having (10) a low density plastic or rubber removable plug or screw type cap placed at the bottom of (5) the dispenser vial, so as, to act as a shock absorber or having shock absorbing characteristics, when attached in the manner as described herein, that by its servitude, prevents damage to said flexible shell plastic water pressure activated dispenser vial, when subjected to the lateral and vertical movement of a weighted fishing rig below said (5) dispenser vial, whereby the relationship of (5) said dispenser is above or below the actual placement of a fishing hook, or on an extended trailer of fishing line or leader free of the main fishing retrieval line (35) whereby it could float behind or downstream of the fishing rig, given the direct action of water currents.

The removable bottom closure (10) serves in its 180 degree customary position to act as a means of filling said (5) dispenser vial, when inverted to the customary top vertical position, and, in addition acts as shock absorber while the (10) bottom closure cap is in its use position integral to the fishing line or leader whether being of an inserted plug or screw cap design.

In its placement to the fishing line or leader the (35) fishing line is inserted through (40) the top drilled hole and run through the (5) dispenser vial, and then through the (50) concentric bottom hole, of (10) the bottom closure, in a manner so as to have (10) the bottom closure in a position nearest the baited hook or fishing jig. In this position the (5) dispenser vial is inverted 180 degrees from its customary shelf position for the containment of fluids or solids, making the (5) dispenser vial act in a new and previously unknown manner, whereas, its prior use was to contain material(s) at atmospheric pressure, and now, in its modified new use, now causes the (5) dispenser vial to release semi-fluids from the top (55) annular space and the bottom (75) annular space, while subjected to below atmospheric water pressures, which, by those pressures distorts the flexible shell plastic dispenser vial in an inward manner, so as to crush the shell slightly, thereby gently releasing the fish attractant chum to the water about the dispenser vial, thereby allowing the presentation of a trail of odor directly to the baited hook or fishing jig, as caused by water currents and results being the drawing in of fishes to the area about the (5) dispenser vial. It is commonly known that fishes swim upstream in search of a substance that emits an attractive odor, such as sharks will swim to the scene of blood as discussed in the Discussion Of Prior Art section contained herein.

Economically, the invention is of a low capital outlay from the manufacturing and marketing viewpoints, simplified in its construction; reuseable in its design form; consistant with the natural presentation of normal scents in the marine eco-system; offers no chance of incidental or accidental harm to marine organisms, and in general, will reveal advantages and benefits over the Prior Art to those skilled in the art of fishing.

It is to be understood, that, the invention in its form herewith, as shown, and in its descriptive data, is to be taken as a preferred example of said invention, and that pertinent or various changes to the physical size, shape, annular variations, or arrangement of the parts named herein, may be resorted to without departure from the the invention in its spirit, use and, or methods or the scope of subjoined claims.

Although the explanations and desriptions of the above contain many specificities, they should not be construed as limiting the scope of the invention, but as mearly providing an illustrative example of some of the current and preferred embodiments of this invention. For examples, the invention could have other shapes or be constructed of other materials such as, a latex rubber tube crimped at both ends, a triangular shape flexible plastic shell tube, a square flexible shell plastic tube, a dual chamber, rigid plastic, or metallic extruded or cast tube, having non-flexible properties, whereby, the lesser diameter tube would be used to run the fishing line through it, and the primary chamber would be used to release the attractant chum from one or two orifices from the cap top or bottom of the device.

Thus, the scope of the invention, should be determined by the appended claims, and their legal equivalents, rather than by the examples given.

I claim:

1. A water pressure activated, reuseable chum dispenser consisting of a removable circular bottom closure having an orifice opening therein; a flexible plastic cylindrical shell having a solid wall and a sealed top having an orifice opening; a fishing line attached longitudinally on said dispenser extending through said openings; whereby a release of said chum from said openings can be activated by water pressure while said dispenser is submerged in water.

* * * * *